US009641724B1

United States Patent
Palanivel et al.

(10) Patent No.: US 9,641,724 B1
(45) Date of Patent: May 2, 2017

(54) METHOD AND SYSTEM FOR COMPRESSING AND CONVERTING AN IMAGE DURING PRINTING

(71) Applicant: XEROX CORPORATION, Norwalk, CT (US)

(72) Inventors: Dhevendra Alagan Palanivel, Chennai (IN); Sainarayanan Gopalakrishnan, Chennai (IN); Xing Li, Webster, NY (US); Sudhagar Subbaian, Coimbatore (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/162,659

(22) Filed: May 24, 2016

(51) Int. Cl.
*H04N 1/405* (2006.01)
*H04N 1/32* (2006.01)
*H04N 1/21* (2006.01)

(52) U.S. Cl.
CPC ....... *H04N 1/40018* (2013.01); *H04N 1/2104* (2013.01); *H04N 1/32277* (2013.01); *H04N 2201/0094* (2013.01)

(58) Field of Classification Search
CPC ............. H04N 1/40018; H04N 1/2104; H04N 1/32277; H04N 2201/0094
See application file for complete search history.

(56) References Cited

U.S. PATENT DOCUMENTS 8,022,991 B1   9/2011  Kancler et al.

FOREIGN PATENT DOCUMENTS

WO          WO 9636941 A1     11/1996

*Primary Examiner* — Christopher D Wait

(57) ABSTRACT

A method and a system for image compression are disclosed. An image is converted to a halftoned image. The one or more halftoned lines in the halftoned image comprise one or more pixels. A first transformed image is generated from the halftoned image based on shifting of the one or more pixels, associated with the one or more halftoned lines in the halftoned image, by a first value. A second transformed image is generated from the first transformed image based on shifting of the one or more pixels, associated with the one or more halftoned lines in the first transformed image, by a second value. Further, a compressed image is generated based on compression of the second transformed image. The compressed image is stored in a storage device. Another method and system for image conversion are disclosed that converts the compressed image back to the first transformed image.

29 Claims, 6 Drawing Sheets

METHOD AND SYSTEM FOR COMPRESSING AND CONVERTING AN IMAGE DURING PRINTING

TECHNICAL FIELD

The presently disclosed embodiments are related, in general, to image processing. More particularly, the presently disclosed embodiments are related to method and system for compressing and converting an image during printing of the image.

BACKGROUND

With ever-increasing advancements in the field of image processing, there is observed an augmented usage of memory units in electronic devices. Generally, the memory units are utilized to temporarily store one or more portions of an image that may be extracted later on or in near-real time for performing a specified task. For example, in a print path, an image is usually screened and converted into a binary image. Thereafter, the binary image may be compressed and stored in the memory unit of a printing device.

When the printing device is ready for printing or marking, the stored compressed image is retrieved and decompressed to obtain the binary image and thereafter, the binary image is transmitted for printing. However, the binary image may not provide a good run length during the encoding process, leading to a reduced compression ratio. As a result, the binary image may require more space for storage in the memory unit. Therefore, an efficient lossless image processing technique may be desirable that may be utilized to increase the compression ratio of the image.

Further limitations and disadvantages of conventional and traditional approaches will become apparent to one of skilled in the art through a comparison of the described systems with some aspects of the present disclosure, as set forth in the remainder of the present application and with reference to the drawings.

SUMMARY

According to embodiments illustrated herein, there is provided a method for image compression. The method includes converting, by an image processor, an image to a halftoned image. The halftoned image includes one or more halftoned lines comprising one or more pixels. The method further includes generating, by the image processor, a first transformed image from the halftoned image based on shifting of the one or more pixels, associated with the one or more halftoned lines in the halftoned image, by a first value. The method further includes generating, by the image processor, a second transformed image from the first transformed image based on shifting of the one or more pixels, associated with the one or more halftoned lines in the first transformed image, by a second value. The method further includes generating, by the image processor, a compressed image based on compression of the second transformed image. The compressed image is stored in a storage device.

According to embodiments illustrated herein, there is provided a method for image conversion. The method includes generating, by an image processor, a decompressed image based on a decompression of a compressed image retrieved from a storage device. The decompressed image comprises one or more halftoned lines. Each of the one or more halftoned lines comprises one or more pixels. The method further includes generating, by the image processor, a second transformed image from the decompressed image based on shifting of the one or more pixels, associated with the one or more halftoned lines in the decompressed image, by a second value. The method further includes generating, by the image processor, a first transformed image from the second transformed image based on shifting of the one or more pixels, associated with the one or more halftoned lines in the second transformed image, by a first value. The first transformed image is stored in the storage device.

According to embodiments illustrated herein, there is provided a system for image compression. The system includes an image processor configured to convert an image to a halftoned image. The halftoned image includes one or more halftoned lines comprising one or more pixels. The image processor is further configured to generate a first transformed image from the halftoned image based on circular shifting of the one or more pixels, associated with the one or more halftoned lines in the halftoned image, by a first value. The image processor is further configured to generate a second transformed image from the first transformed image based on circular shifting of the one or more pixels, associated with the one or more halftoned lines in the first transformed image, by a second value. The image processor is further configured to generate a compressed image based on compression of the second transformed image. The compressed image is stored in a storage device.

According to embodiments illustrated herein, there is provided a system for image conversion. The system includes an image processor configured to generate a decompressed image based on a decompression of a compressed image retrieved from a storage device. The decompressed image comprises one or more halftoned lines. Each of the one or more halftoned lines comprises one or more pixels. The image processor is further configured to generate a second transformed image from the decompressed image based on circular shifting of the one or more pixels, associated with the one or more halftoned lines in the decompressed image, by a second value. The image processor is further configured to generate a first transformed image from the second transformed image based on circular shifting of the one or more pixels, associated with the one or more halftoned lines in the second transformed image, by a first value. The first transformed image is stored in the storage device.

According to embodiments illustrated herein, there is provided a non-transitory computer-readable storage medium having stored thereon, a set of computer-executable instructions for image compression. The set of computer-executable instructions is executable by a computer comprising an image processor configured to perform step including converting an image to a halftoned image. The halftoned image includes one or more halftoned lines comprising one or more pixels. The image processor is further configured to perform step including generating a first transformed image from the halftoned image based on shifting of the one or more pixels, associated with the one or more halftoned lines in the halftoned image, by a first value. The image processor is further configured to perform step including generating a second transformed image from the first transformed image based on shifting of the one or more pixels, associated with the one or more halftoned lines in the first transformed image, by a second value. The image processor is further configured to perform step including generating a compressed image based on compression of the second transformed image. The compressed image is stored in a storage device.

According to embodiments illustrated herein, there is provided a non-transitory computer-readable storage medium having stored thereon, a set of computer-executable instructions for image conversion. The set of computer-executable instructions is executable by a computer comprising an image processor configured to perform step including generating a decompressed image based on a decompression of a compressed image retrieved from a storage device. The decompressed image comprises one or more halftoned lines. Each of the one or more halftoned lines comprises one or more pixels. The image processor is further configured to perform step including generating a second transformed image from the decompressed image based on shifting of the one or more pixels, associated with the one or more halftoned lines in the decompressed image, by a second value. The image processor is further configured to perform step including generating a first transformed image from the second transformed image based on shifting of the one or more pixels, associated with the one or more halftoned lines in the second transformed image, by a first value. The first transformed image is stored in the storage device.

BRIEF DESCRIPTION OF DRAWINGS

The accompanying drawings illustrate various embodiments of systems, methods, and other aspects of the disclosure. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
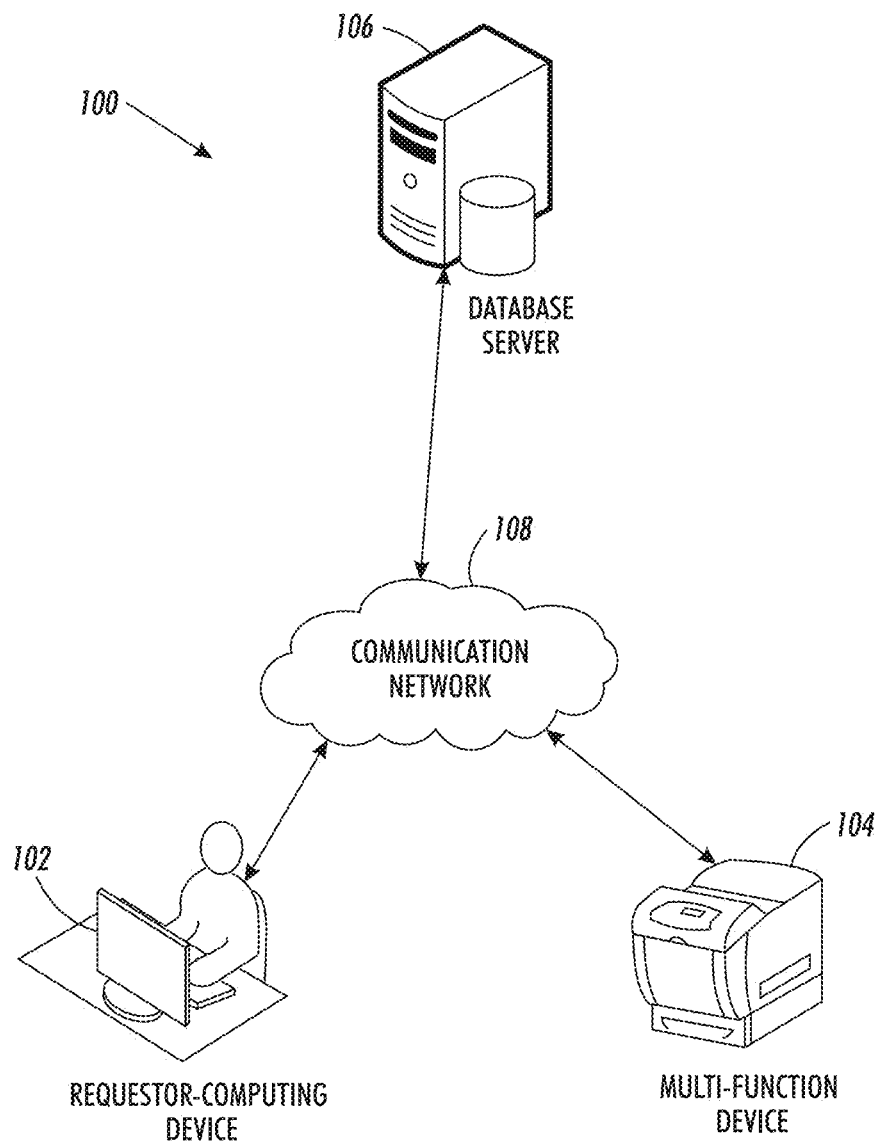
FIG. 1 is a block diagram that illustrates a system environment in which various embodiments of the system may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "an embodiment," "at least one embodiment," "one example," "an example," "for example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

An "image" refers to a collection of pixels retained in an electronic form. The image may correspond to a pictorial representation of one or more objects. In an embodiment, the image may be represented using one or more color schemes, such as, but not limited to, Cyan-Magenta-Yellow-Black (CMYK), Red-Green-Blue (RGB), Hue-Saturation-Value (HSV), YCbCr, Gray Scale, and/or the like. Further, the image may be stored in a memory in various file formats, such as, JPG or JPEG, GIF, TIFF, PNG, BMP, RAW, PSD, PSP, PDF, and/or the like.

A "pixel" refers to the smallest element of image data that can be associated with a small area or spot in an image that may be printed or displayed. In an embodiment, the pixel is represented by bits where the number of bits in the pixel is indicative of the information associated with the pixel.

A "halftoned image" refers to a binary image that includes one or more halftoned lines. The one or more halftoned lines may be parallel to each other. Further, each of the one or more halftoned lines include one or more pixels that are distributed along one or more rows and one or more columns. The halftoned image may be generated based on a conversion of an image (e.g., a continuous tone image) by use of one or more screening techniques known in the art. Examples of the one or more screening techniques may include one or more of, but are not limited to, an amplitude modulated (AM) screening technique, a frequency modulated (FM) screening technique, and a cluster-dot screening technique.

"Circular shifting" refers to shifting of one or more pixels of original image at a specified angle during a horizontal or vertical shear transformation such that one or more corners of the shear transformed image may be wrapped around after the circular shifting. Thus, the same size of the original image may be retained after the shear transformation. Since the circular shifting uses simple shift operations, the original image may be retrieved after decompression without any change in image pixel values. This is in contrast to a normal shifting operation, wherein the one or more corners of the shear transformed image are not wrapped around, and thus may result in loss of image pixel values.

A "first transformed image" refers to a transformed halftoned image that may have been generated from a halftoned image (or a second transformed image) based on at least a circular shifting of one or more pixels associated with one or more halftoned lines in the halftoned image (or the second transformed image). In an embodiment, the circular shifting of the one or more pixels is based on at least one or more screen angles associated with one or more image planes of the halftoned image. In an embodiment, the first transformed image may be generated by use of at least one of a horizontal shear transformation technique or a vertical shear transformation technique.

A "second transformed image" refers to a transformed halftoned image that may have been generated from a first transformed image (or a decompressed halftoned image) based on at least a circular shifting of one or more pixels associated with one or more halftoned lines in the first transformed image (or the decompressed halftoned image). In an embodiment, the circular shifting of the one or more pixels is based on at least one or more screen angles associated with one or more image planes of the first transformed image (or the decompressed halftoned image). In an embodiment, the second transformed image may be generated by use of at least one of a horizontal shear transformation technique or a vertical shear transformation technique.

"Image compression" refers to a process of reducing the size of an original image without degrading the quality of the original image below a predefined level. The reduction in the size may allow more images to be stored in a given amount of memory space. In an embodiment, the original image may be compressed by use of one or more compression techniques known in the art.

"Compression ratio" refers to a ratio of the size of an original image to the size of a compressed image. For example, when the size of an original image is "2 MB" and the size of a compressed image is "1 MB," the compression ratio is "2."

"Image decompression" refers to a process of expanding a compressed image back to its original form. The compressed image may be decompressed by use of one or more decompression techniques known in the art.

FIG. 1 is a block diagram that illustrates a system environment in which various embodiments may be implemented. With reference to FIG. 1, there is shown a system environment 100 that includes a requestor-computing device 102, a multi-function device 104, a database server 106, and a communication network 108. Various devices in the system environment 100 may be interconnected over the communication network 108. FIG. 1 shows, for simplicity, one requestor-computing device, such as the requestor-computing device 102, one multi-function device, such as the multi-function device 104, and one database server, such as the database server 106. However, it will be apparent to a person having ordinary skills in the art that the disclosed embodiments may also be implemented using multiple requestor-computing devices, multiple multi-function devices, and multiple database servers without departing from the scope of the disclosure.

The requestor-computing device 102 refers to a computing device that may be utilized by one or more requestors associated with an entity (e.g., an organization, or an institution) to perform one or more printing operations. The one or more requestors associated with the entity may correspond to one or more of an employee, an employer, a student, and/or the like.

Further, the requestor-computing device 102 may comprise one or more processors in communication with one or more memories. The one or more memories may include one or more computer readable codes, instructions, programs, or algorithms that are executable by the one or more processors to perform the one or more printing operations. In an embodiment, the requestor may utilize the requestor-computing device 102 to communicate with the multi-function device 104 or the database server 106 over the communication network 108 (e.g., using wired or wireless communication capabilities). Based on the communication, the requestor may utilize the requestor-computing device 102 to transmit one or more requests pertaining to the one or more printing operations to the multi-function device 104 or the database server 106. The requestor may further transmit one or more images, associated with the one or more printing operations, to the multi-function device 104 or the database server 106 over the communication network 108. The requestor may further utilize the requestor-computing device 102 to retrieve the one or more images from the multi-function device 104 or the database server 106 over the communication network 108. Examples of the requestor-computing device 102 may include, but are not limited to, a desktop computer, a laptop, a personal digital assistant (PDA), a mobile device, a smart phone, a tablet computer (e.g., iPad® and Samsung Galaxy Tab®), and/or the like.

The multi-function device 104 refers to an electronic device that may be configured to perform one or more associated operations. The one or more associated operations may include one or more of, but are not limited to, scanning, copying, printing, e-mailing, faxing, and/or the like. The multi-function device 104 may comprise one or more processors, in communication with one or more memories. The one or more memories may include one or more computer readable codes, instructions, programs, or algorithms that are executable by the one or more processors to perform the one or more associated operations.

In an embodiment, the multi-function device 104 may be configured to receive the one or more requests from the requestor-computing device 102 over the communication network 108. The one or more requests may be indicative of the one or more associated operations. The multi-function device 104 may further receive the one or more images associated with the each of the one or more requests from the requestor-computing device 102. In another embodiment, the multi-function device 104 may extract the one or more requests and the associated one or more images from the database server 106 over the communication network 108. In a scenario where the one or more images are in form of one or more hard copies, the multi-function device 104 may be configured to scan the one or more hard copies to obtain one or more scanned-images.

Thereafter, the multi-function device 104 may store the one or more images (or the one or more scanned-images) in the one or more memories. However, the multi-function device 104 may have a limited storage space in the one or more memories. In such a case, the multi-function device 104 may be configured to compress the one or more images (or the one or more scanned-images) to obtain one or more compressed images. In order to increase a compression ratio of each of the one or more compressed images, the multi-function device 104 may be configured to convert the one or more images (or the one or more scanned-images) into one or more halftoned images. The one or more halftoned images may include one or more halftoned lines. Further, each of the one or more halftoned lines comprises one or more pixels that are distributed along one or more rows and one or more columns. Further, in an embodiment, the multi-function device 104 may be configured to generate one or more first transformed images from the one or more halftoned images, and thereafter, may generate one or more second transformed images from the one or more first transformed images. The generation of the one or more first transformed images and the one or more second transformed images is based on at least a circular shifting of the one or more pixels in each of the one or more halftoned images and the one or more first transformed images, respectively. In an embodiment, during circular shifting, the one or more pixels are shifted such that halftoned lines in the second transformed image are aligned in parallel, or in other words zero degree, with respect to horizontal reference. The generation of the one or more first transformed images and the one or more second transformed images has been explained in detail in conjunction with FIG. 3.

Thereafter, the multi-function device 104 may be configured to compress the one or more second transformed images to generate the one or more compressed images. Further, the multi-function device 104 may be configured to store the one or more compressed images into the one or more memories. Further, in an embodiment, the multi-function device 104 may be configured to process the one or more requests based on at least a sequence of storage of the one or more requests and the associated one or more images (or the one or more scanned-images) in the one or more memories or the database server 106.

Prior to the processing of the one or more requests, the multi-function device 104 may be configured to decompress the one or more compressed images to obtain one or more decompressed images. Further, in an embodiment, the multi-function device 104 may be configured to transform the one or more decompressed images to generate the one or more second transformed images based on at least the circular shifting of the one or more pixels in the one or more decompressed images. Thereafter, the multi-function device 104 may be configured to transform the one or more second transformed images to generate the one or more first transformed images based on at least the circular shifting of the one or more pixels in the one or more second transformed images. The generation of the one or more second transformed images and the one or more first transformed images from the one or more decompressed images and the one or more second transformed images, respectively, has been explained in detail in conjunction with FIG. 3.

Further, in an embodiment, the multi-function device 104 may be configured to utilize the one or more first transformed images, generated from the one or more second transformed images, to process the one or more associated operations in the one or more requests. The multi-function device 104 has been explained in detail in conjunction with FIG. 2 and FIG. 3. Examples of the multi-function device 104 may include, but are not limited to, one or more types of a multi-function printer, such as an all-in-one multi-function printer, a small office/home office (SOHO) multi-function printer, an office multi-function printer, a production printing multi-function printer, and/or the like.

A person having ordinary skills in the art will understand that the scope of the disclosure is not limited to the multi-function device 104 as the electronic device with multiple functionalities, such as scanning, copying, printing, e-mailing, faxing, and/or the like. The multi-function device 104 may perform additional functionalities, such as image processing, without deviating from the scope of the disclosure.

The database server 106 refers to a computer or a storage device that may be configured to store the one or more requests and the associated one or more images (or the one or more scanned-images) received from the requestor-computing device 102 or the multi-function device 104, in accordance with at least one embodiment. In an embodiment, the database server 106 may further be configured to store the one or more halftoned images, the one or more first transformed images, the one or more second transformed images, the one or more compressed images, and the one or more decompressed images. In an embodiment, the database server 106 may receive the one or more halftoned images, the one or more first transformed images, the one or more second transformed images, the one or more compressed images, and the one or more decompressed images from the multi-function device 104 over the communication network 108. Further, in an embodiment, the database server 106 may include a separate buffer to store each of the one or more halftoned images, the one or more first transformed images, the one or more second transformed images, the one or more compressed images, and the one or more decompressed images.

Further, in an embodiment, the database server 106 may store one or more sets of instructions, codes, scripts, or programs that may be retrieved by the multi-function device 104 to perform the one or more associated operations. For querying the database server 106, one or more querying languages may be utilized. Examples of the one or more query languages may include, but are not limited to, Structured Query Language (SQL), QUEry Language (QUEL), and Data Mining Extensions (DMX). Further, the database server 106 may be realized through various technologies such as, but not limited to, Microsoft® SQL server, Oracle, and My SQL. In an embodiment, the requestor-computing device 102 or the multi-function device 104 may connect to the database server 106 using one or more protocols, such as, but not limited to, Open Data Base Connectivity (ODBC) protocol and Java Data Base Connectivity (JDBC) protocol.

The communication network 108 may include a medium through which devices, such as the requestor-computing device 102, the multi-function device 104, and the database server 106, may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11 and 802.16, cellular communication protocols, such as Long Term Evolution (LTE), and/or Bluetooth communication protocols.

Figure 2:
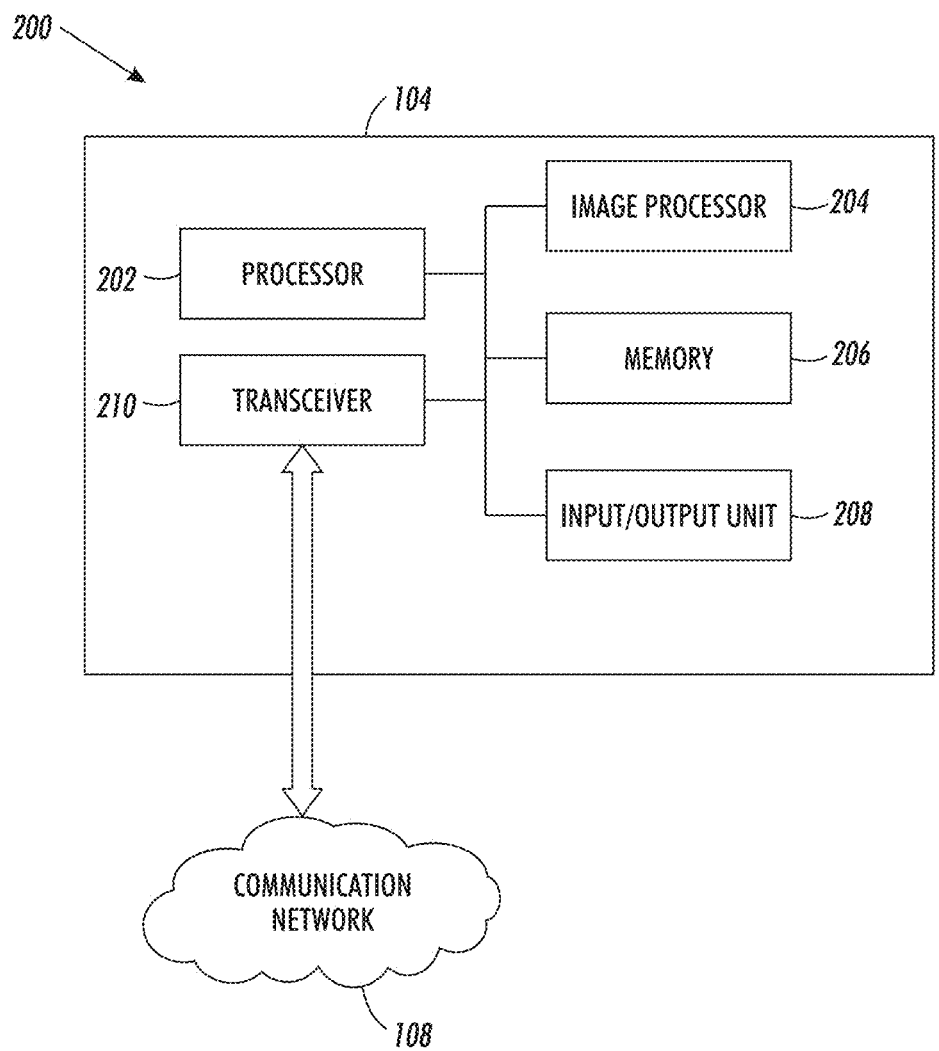
FIG. 2 is a block diagram that illustrates various components of a multi-function device, in accordance with at least one embodiment.

FIG. 2 is a block diagram 200 that illustrates various components of the multi-function device 104, in accordance with at least one embodiment. FIG. 2 is explained in conjunction with the FIG. 1. The multi-function device 104 may include one or more processors, such as a processor 202, one or more image processors, such as an image processor 204, one or more memories, such as a memory 206, one or more input/output (I/O) units, such as an input/output (I/O) unit 208, and one or more transceivers, such as a transceiver 210. A person having ordinary skills in the art will appreciate that the scope of the disclosure is not limited to the components as described herein. The multi-function device 104 may include one or more other components without limiting the scope of the disclosure.

The processor 202 may comprise suitable logic, circuitry, interface, and/or code that may be configured to execute one or more sets of instructions, codes, scripts, or programs stored in the memory 206. The processor 202 may be communicatively coupled to the image processor 204, the memory 206, the I/O unit 208, and the transceiver 210. The processor 202 in coordination with the image processor 204, the memory 206, the I/O unit 208, and the transceiver 210 may be configured to execute the one or more sets of instructions, programs, codes, and/or scripts stored in the memory 206 to perform the one or more associated operations. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or the like.

The image processor 204 may comprise suitable logic, circuitry, interface, and/or code that may be configured to execute one or more sets of instructions, codes, scripts, or programs stored in the memory 206. The image processor 204 may be communicatively coupled to the processor 202, the memory 206, the I/O unit 208, and the transceiver 210. The image processor 204 may execute the one or more sets of instructions, programs, codes, and/or scripts stored in the memory 206 to perform the one or more associated operations. For example, the image processor 204 may be configured to generate a halftoned image of an image. The image processor 204 may further be configured to generate a first transformed image from the halftoned image, and thereafter, a second transformed image from the first transformed image. Thereafter, the image processor 204 may compress the second transformed image to generate a compressed image that is stored in the memory 206. The functionalities of the image processor 204 have been explained in detail in conjunction with FIG. 3 and FIG. 4. The image processor 204 may be implemented based on a number of processor technologies known in the art. Examples of the image processor 204 include, but are not limited to, an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or the like.

The memory 206 may comprise suitable logic, circuitry, interface, and/or code that may be configured to store one or more machine codes, and/or computer programs having at least one code section executable by the processor 202 and/or the image processor 204. The memory 206 may be further configured to store the one or more sets of instructions, codes, and/or scripts. In an embodiment, the memory 206 may be configured to store the image that may be received from the requestor-computing device 102. Further, the memory 206 may be configured to store the compressed image, one or more transformed images, and/or a decompressed image. Examples of the commonly known memory implementations may include, but are not limited to, a random access memory (RAM), a read only memory (ROM), a hard disk drive (HDD), and a secure digital (SD) card. It will be apparent to a person having ordinary skills in the art that the one or more sets of instructions, programs, codes, and/or scripts stored in the memory 206 may enable the hardware of the multi-function device 104 to perform the one or more associated operations.

The I/O unit 208 may comprise suitable logic, circuitry, interface, and/or code that may be operable to receive the one or more requests from the requestor-computing device 102 through the transceiver 210 over the communication network 108. Further, the I/O unit 208 may be configured to transmit one or more responses, pertaining to the one or more requests, to the requestor-computing device 102 over the communication network 108. The I/O unit 208 may be operable to communicate with the processor 202, the image processor 204, the memory 206, and the transceiver 210. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

The transceiver 210 may comprise suitable logic, circuitry, interface, and/or code that may be configured to communicate with one or more computing devices, such as the requestor-computing device 102, one or more multi-function devices, such as the multi-function device 104, and one or more database servers, such as the database server 106, over the communication network 108. The transceiver 210, in conjunction with the I/O unit 208, may be configured to transmit or receive the one or more sets of instructions, queries, and/or other information to/from various components of the system environment 100. The transceiver 210 may implement one or more known technologies to support wired or wireless communication with the communication network 108. In an embodiment, the transceiver 210 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, and a protocol for email, instant messaging, and/or Short Message Service (SMS).

Figure 3:
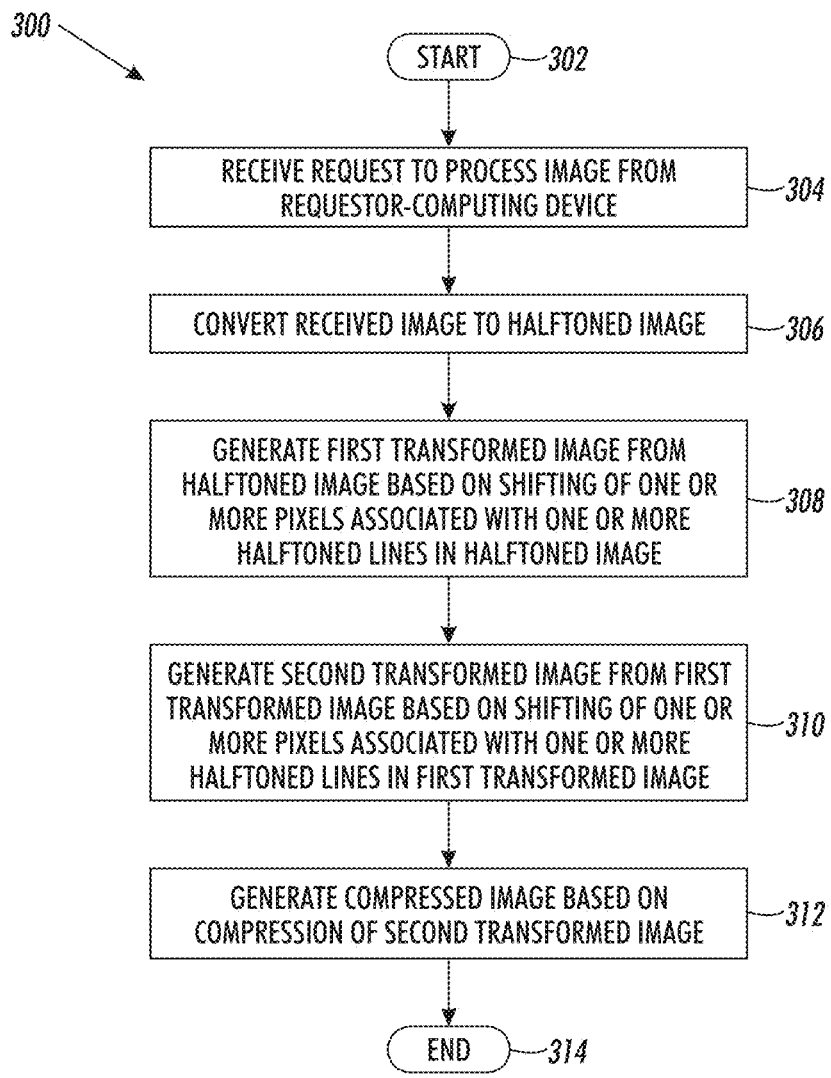
FIG. 3 is a flowchart that illustrates a method for image compression, in accordance with at least one embodiment.

FIG. 3 is a flowchart that illustrates a method for image compression, in accordance with at least one embodiment. With reference to FIG. 3, there is shown a flowchart 300 described in conjunction with FIG. 1 and FIG. 2. The method starts at step 302 and proceeds to step 304.

At step 304, a request to process an image is received from the requestor-computing device 102. In an embodiment, the processor 202 in conjunction with the transceiver 210 may be configured to receive the request to process the image from the requestor-computing device 102 over the communication network 108. In an embodiment, the requestor may utilize the requestor-computing device 102 to transmit the request to the multi-function device 104 over the communication network 108. The request may include the image (i.e., a soft-copy of the image) and information about one or more operations (e.g., print, scan, fax, and/or the like) that are required to be performed on the image. In an embodiment, the received image may include one or more image planes. For example, the one or more image planes may be based on one or more color schemes such as, but not limited to, CMYK (Cyan-Magenta-Yellow-Black), RGB (Red-Green-Blue), HSV (Hue-Saturation-Value), YCbCr, Gray Scale, and/or the like. Further, each of the one or more image planes may be associated with a predefined angle (i.e., a screen angle). For example, a screen angle of a cyan image plane, a magenta image plane, a yellow image plane, and a black image plane in CMYK color plane may correspond to "15 degree," "75 degree," "0 degree," and "45 degree," respectively. The screen angle of each of the one or more image planes is with respect to a reference plane of an image frame, such as a vertical plane, associated with the image.

In certain scenarios, the requestor may utilize the multi-function device 104 to transmit the request and the associated image. For example, in the absence of a soft-copy of an image, the requestor may utilize the multi-function device 104 to transmit a request and an associated image, to the processor 202 of the multi-function device 104. For example, the requestor may utilize the multi-function device 104 to scan a hard-copy of an image and thereafter, may provide information about one or more operations that are required to be performed on the scanned-image. The received image may correspond to the soft-copy of the image or the scanned-image of the hard-copy of the image. After receiving the request and the image, the processor 202 in conjunction with the transceiver 210 may store the received request and the received image in the memory 206 or the database server 106.

At step 306, the received image is converted to a halftoned image. In an embodiment, the image processor 204 may be configured to convert the received image to the halftoned image. The halftoned image may correspond to a binary image comprising the one or more halftoned lines. The one or more halftoned lines may include the one or more pixels that are distributed along the one or more rows and the one or more columns in the halftoned image. In an embodiment, the image processor 204 may be configured to utilize one or more screening techniques known in the art to convert the received image to the halftoned image. Examples of the one or more screening techniques may include, but are not limited to, an AM screening technique, a FM screening technique, and a cluster-dot screening technique.

In an embodiment, the received image may include more than one color planes. In such a scenario, the image processor 204 may be configured to convert the one or more image planes (e.g., CMYK image planes) in the received image into one or more halftoned image planes. The halftoned image may comprise the one or more halftoned image planes. The one or more halftoned image planes may further include the one or more halftoned lines, such that each of the one or more halftoned lines includes the one or more pixels. The one or more pixels associated with each of the one or more halftoned image planes in the halftoned image may be distributed along the one or more rows and the one or more columns.

At step 308, a first transformed image is generated from the halftoned image based on shifting of the one or more pixels associated with the one or more halftoned lines in the halftoned image. In an embodiment, the image processor 204 may be configured to generate the first transformed image from the halftoned image based on the shifting of the one or more pixels associated with the one or more halftoned lines in the halftoned image. In an embodiment, the shifting may correspond to the circular shifting. The image processor 204 may be configured to perform the circular shifting of the one or more pixels in each of the one or more rows associated with each of the one or more halftoned image planes. The circular shifting is based on at least a first value associated with each of the one or more rows. In an embodiment, the processor 202 may determine the first value, pertaining to each of the one or more rows in each of the one or more halftoned image planes, based on at least a screen angle associated with each of the one or more halftoned image planes.

A person having ordinary skills in the art will understand that for brevity, hereinafter, the method for generation of a compressed image from the halftoned image has been explained based on an assumption that the received image (or the halftoned image) includes only one color image plane. Notwithstanding, the disclosure may not be so limited, and the method may be further implemented for more than one color image planes, without limiting the scope of the disclosure.

Prior to the determination of the first value, the processor 202 may be configured to determine a count of the one or more rows associated with a halftoned image plane of the halftoned image. For example, a halftoned image includes a cyan halftoned image plane. In such a case, the processor 202 may determine a count of one or more rows associated with the cyan halftoned image plane.

Thereafter, the processor 202 may be configured to determine an angular value (i.e., a shear angle) based on at least the screen angle associated with the halftoned image plane of the halftoned image. In an exemplary scenario, the processor 202 may utilize the following relation (denoted by equation-1) to determine the angular value (i.e., the shear angle):

$$\text{shear angle} = 90° - \theta \quad (1)$$

where, $\theta$: corresponds to a screen angle of a halftoned image plane in a halftoned image.

After the determination of the angular value (i.e., the shear angle), the processor 202 may further be configured to determine a first parameter value based on the determined the angular value (i.e., the shear angle). In an exemplary scenario, the processor 202 may utilize the following relation (denoted by equation-2) to determine the first parameter value:

$$\alpha = -\tan\left(\frac{\text{shear angle}}{2}\right) \quad (2)$$

where, $\alpha$: corresponds to a first parameter value.

Thereafter, the processor 202 may be configured to determine the first value, pertaining to each of the one or more rows of the halftoned image plane, based on at least the first parameter value and the count of the one or more rows in the halftoned image plane of the halftoned image. In an exemplary scenario, the processor 202 may utilize the following relation (denoted by equation-3) to determine the first value pertaining to a row "i":

$$\text{first value of row "i"} = \alpha * \left(i - \frac{n_{row}}{2}\right) \quad (3)$$

where, $n_{row}$: corresponds to a count of one or more rows in a halftoned image plane of a halftoned image.

Thereafter, the image processor 204 may be configured to perform the circular shifting of the one or more pixels in the row "i" based on the determined first value. In an embodiment, the image processor 204 may be configured to circularly shift the one or more pixels in the row "i" by the determined first value of the row "i". In an embodiment, the image processor 204 may be configured to shift the one or more pixels in the row "i" to the right if the determined first value is positive (i.e. first value of row "i">0). In another embodiment, the image processor 204 may be configured to shift the one or more pixels in the row "i" to the left if the determined first value is negative (i.e., first value of row "i"<0).

Similarly, the processor 202 may be configured to determine the first value for each of the remaining one or more rows in the halftoned image plane of the halftoned image. Thereafter, the image processor 204 may be configured to shift the one or more pixels in each of the remaining one or more rows based on the corresponding first value. In an embodiment, a transformed image obtained, after the circular shifting of the one or more pixels pertaining to the one or more rows in the halftoned image plane of the halftoned image, corresponds to the first transformed image. If the halftoned image includes more than one halftoned image plane, the image processor 204 may be configured to perform the circular shifting of the one or more pixels for each of the remaining halftoned image planes to generate the first transformed image. The image processor 204 in conjunction with the transceiver 210 may store the first transformed image in the memory 206 or the database server 106.

At step 310, a second transformed image is generated from the first transformed image based on shifting of the one or more pixels associated with the one or more halftoned lines in the first transformed image. In an embodiment, the image processor 204 may be configured to generate the second transformed image from the first transformed image based on the shifting of the one or more pixels associated with the one or more halftoned lines in the first transformed image. In an embodiment, the shifting may correspond to the circular shifting. The image processor 204 may be configured to perform the circular shifting of the one or more pixels in each of the one or more columns associated with the halftoned image plane. The circular shifting is based on at least a second value associated with each of the one or more columns. In an embodiment, the processor 202 may determine the second value, pertaining to each of the one or more columns in the halftoned image plane, based on at least the screen angle associated with the halftoned image plane.

Prior to the determination of the second value, the processor 202 may be configured to determine a count of the one or more columns associated with the halftoned image plane of the first transformed image. For example, a first transformed image includes a cyan halftoned image plane. In such a case, the processor 202 may determine a count of columns associated with the cyan halftoned image plane.

Thereafter, the processor 202 may be configured to determine the angular value (i.e., the shear angle) based on at least the screen angle associated with the halftoned image plane of the first transformed image, in a similar way as discussed above in step 308.

After the determination of the angular value (i.e., the shear angle), the processor 202 may further be configured to determine a second parameter value based on the determined angular value (i.e., the shear angle). In an exemplary scenario, the processor 202 may utilize the following relation (denoted by equation-4) to determine the second parameter value:

$$\beta = \sin(\text{shear angle}) \quad (4)$$

where, $\beta$: corresponds to a second parameter value.

Thereafter, the processor 202 may be configured to determine the second value, pertaining to each of the one or more columns of the halftoned image plane, based on at least the second parameter value and the count of the one or more columns. In an exemplary scenario, the processor 202 may utilize the following relation (denoted by equation-5) to determine the second value pertaining to a column "j":

$$\text{second value of column } "j" = \beta * \left( j - \frac{n_{col}}{2} \right) \quad (5)$$

where, $n_{col}$: corresponds to a count of one or more columns in a halftoned image plane of a first transformed image.

Thereafter, the image processor 204 may be configured to perform the circular shifting of the one or more pixels in the column "j" based on the determined second value. In an embodiment, the image processor 204 may be configured to circularly shift the one or more pixels in the column "j" by the determined second value of the column "j". In an embodiment, the image processor 204 may be configured to shift the one or more pixels in the column "j" in a downward direction if the determined second value is positive (i.e., second value of column "j">0). In another embodiment, the image processor 204 may be configured to shift the one or more pixels in the column "j" in the upward direction if the determined second value is negative (i.e., second value of column "j"<0).

Similarly, the processor 202 may be configured to determine the second value for each of the remaining one or more columns in the halftoned image plane of the first transformed image. Thereafter, the image processor 204 may be configured to shift the one or more pixels in each of the remaining one or more columns based on the corresponding second value. In an embodiment, a transformed image obtained, after the circular shifting of the one or more pixels pertaining to the one or more columns in the halftoned image plane of the first transformed image, corresponds to the second transformed image. In case the first transformed image includes more than one halftoned image plane, the image processor 204 may be configured to perform the circular shifting of the one or more pixels for each of the remaining halftoned image planes to generate the second transformed image. In an embodiment, during circular shifting, the one or more pixels are shifted such that halftoned lines in the second transformed image are aligned in parallel, or in other words at zero degree, with respect to horizontal reference. The image processor 204 in conjunction with the transceiver 210 may store the second transformed image in the memory 206 or the database server 106.

At step 312, the compressed image is generated based on compression of the second transformed image. In an embodiment, the image processor 204 may be configured to generate the compressed image based on the compression of the second transformed image. In an embodiment, the image processor 204 may utilize one or more compression techniques known in the art to compress the second transformed image. In an embodiment, the image processor 204 in conjunction with the transceiver 210 may store the compressed image in a storage device. The storage device may correspond to the memory 206 within the multi-function device 104. The storage device may correspond to an external storage device, such as a floppy disk, a pen drive, a hard disk, and/or the like. In an embodiment, the compressed image may be transferred to the database server 106 for storage. Control passes to end step 314.

Figure 4:
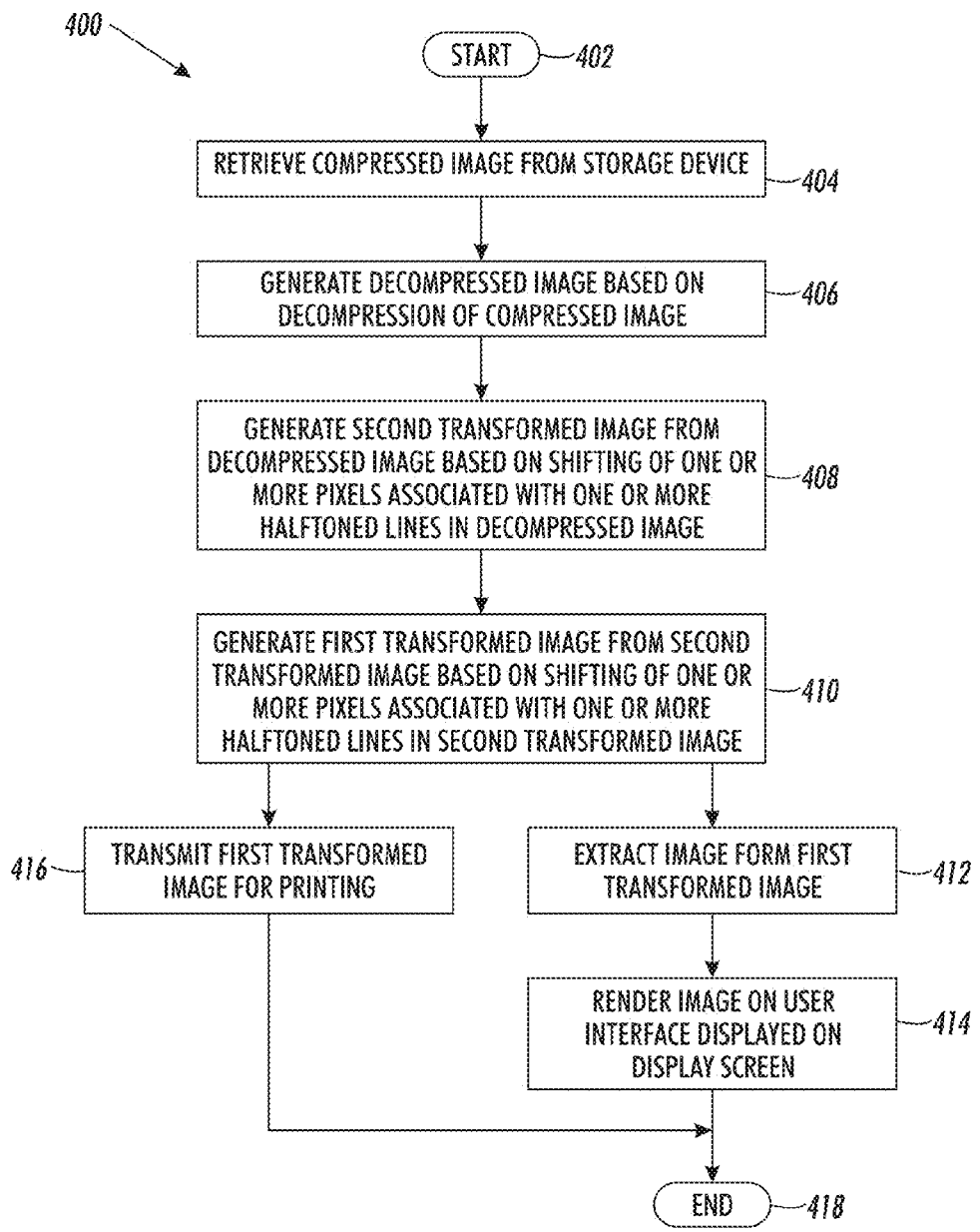
FIG. 4 is a flowchart that illustrates a method for image conversion, in accordance with at least one embodiment.

FIG. 4 is a flowchart that illustrates a method for image conversion, in accordance with at least one embodiment. With reference to FIG. 4, there is shown a flowchart 400 described in conjunction with FIG. 1, FIG. 2, and FIG. 3. The method starts at step 402 and proceeds to step 404.

At step 404, a compressed image may be retrieved from the storage device. In an embodiment, the processor 202 may be configured to retrieve the compressed image from the storage device, such as the memory 206 of the multi-function device 104. In an embodiment, the processor 202 may be configured to retrieve the compressed image from the external storage device, such as a floppy disk, a pen drive, a hard disk, and/or the like. In an embodiment, the processor 202 may be configured to retrieve the compressed image from the database server 106.

After retrieval of the compressed image, at step 406, the decompressed image is generated based on a decompression of the compressed image. In an embodiment, the image processor 204 may be configured to generate the decompressed image based on the decompression of the compressed image. The image processor 204 may decompress the compressed image by use of one or more decompression techniques known in the art. In an embodiment, the decompressed image may comprise the one or more halftoned lines. The one or more halftoned lines may include the one or more pixels that are distributed along the one or more rows and the one or more columns in the decompressed image. In a scenario where the decompressed image is independent of the one or more halftoned lines, the image processor 204 may further be configured to convert the decompressed image to obtain a decompressed halftoned image. The decompressed halftoned image may comprise the one or more halftoned lines. The one or more halftoned lines may include the one or more pixels that are distributed along the one or more rows and the one or more columns in the decompressed halftoned image. Further, in an embodiment, the decompressed image (or the decompressed halftoned image) may include the one or more halftoned image planes. For example, the one or more halftoned image planes may be based on one or more color schemes such as, but are not limited to, CMYK (Cyan-Magenta-Yellow-Black), RGB (Red-Green-Blue), HSV (Hue-Saturation-Value), YCbCr, Gray Scale, and/or the like. Further, each of the one or more halftoned image planes may be associated with the screen angle, as discussed in FIG. 3.

A person having ordinary skills in the art will understand that for brevity, hereinafter, the method for image conversion from the compressed image has been explained based on an assumption that the compressed image includes only one halftoned image plane. Notwithstanding, the disclosure may not be so limited, and the method may be further implemented for more than one halftoned image planes, without limiting the scope of the disclosure.

At step 408, a second transformed image may be generated from the decompressed image based on shifting of the one or more pixels associated with the one or more halftoned lines in the decompressed image. In an embodiment, the image processor 204 may be configured to generate the second transformed image from the decompressed image based on the shifting of the one or more pixels associated with the one or more halftoned lines in the decompressed image. In an embodiment, the shifting may correspond to the circular shifting. The image processor 204 may be configured to perform the circular shifting of the one or more pixels in each of the one or more columns, associated with the halftoned image plane of the decompressed image (or the decompressed halftoned image), based on at least a second value associated with each of the one or more columns. In an embodiment, the processor 202 may determine the second value, pertaining to each of the one or more columns in the halftoned image plane of the decompressed image (or the decompressed halftoned image), based on at least the screen angle associated with the halftoned image plane.

Prior to the determination of the second value, the processor 202 may be configured to determine the count of the one or more columns associated with the halftoned image plane of the decompressed image (or the decompressed halftoned image). Thereafter, the processor 202 may be configured to determine the angular value (i.e., the shear angle) based on at least the screen angle associated with the halftoned image plane of the decompressed image (or the decompressed halftoned image). In an exemplary scenario, the processor 202 may utilize the following relation (denoted by equation-6) to determine the angular value (i.e., the shear angle):

$$\text{shear angle} = -(90° - \theta) \quad (6)$$

where, $\theta$: corresponds to a screen angle of a halftoned image plane.

After the determination of the angular value (i.e., the shear angle), the processor 202 may further be configured to determine the second parameter value based on the determined angular value (i.e., the shear angle). In an exemplary scenario, the processor 202 may utilize the following relation (denoted by equation-7) to determine the second parameter value:

$$\beta = \sin(\text{shear angle}) \quad (7)$$

where, $\beta$: corresponds to a second parameter value.

Thereafter, the processor 202 may be configured to determine the second value, pertaining to each of the one or more columns of the halftoned image plane in the decompressed image (or the decompressed halftoned image), based on at least the second parameter value and the count of the one or more columns in the halftoned image plane of the decompressed image (or the decompressed halftoned image). In an exemplary scenario, the processor 202 may utilize the following relation (denoted by equation-8) to determine the second value pertaining to a column "j":

$$\text{second value of column "}j\text{"} = \beta * \left( j - \frac{n_{col}}{2} \right) \quad (8)$$

where, $n_{col}$: corresponds to a count of one or more columns in a halftoned image plane of a decompressed image (or a decompressed halftoned image).

Thereafter, the image processor 204 may be configured to perform the circular shifting of the one or more pixels in the column "j" based on the determined second value. In an embodiment, the image processor 204 may be configured to circularly shift the one or more pixels in the column "j" by the determined second value of the column "j". In an embodiment, the image processor 204 may be configured to shift the one or more pixels in the column "j" in a downward direction if the determined second value is positive (i.e. second value of column, j>0). In another embodiment, the image processor 204 may be configured to shift the one or more pixels in the column "j" in the upward direction if the determined second value is negative (i.e. second value of column "j"<0).

Similarly, the processor 202 may be configured to determine the second value for each of the remaining one or more columns in the halftoned image plane of the decompressed image (or a decompressed halftoned image). Thereafter, the image processor 204 may be configured to shift the one or more pixels in each of the remaining one or more columns based on the corresponding second value. If the decompressed image (or a decompressed halftoned image) includes more than one halftoned image plane, the image processor 204 may be configured to perform the circular shifting of the one or more pixels for each of the remaining halftoned image planes to generate the second transformed image. The image processor 204 in conjunction with the transceiver 210 may store the second transformed image in the memory 206 or the database server 106.

At step 410, a first transformed image may be generated from the second transformed image based on shifting of the one or more pixels associated with the one or more halftoned lines in the second transformed image. In an embodiment, the image processor 204 may be configured to generate the first transformed image from the second transformed image based on the shifting of the one or more pixels associated with the one or more halftoned lines in the second transformed image. In an embodiment, the shifting may correspond to the circular shifting. The image processor 204 may be configured to perform the circular shifting of the one or more pixels in each of the one or more rows, associated with the halftoned image plane of the second transformed image, based on at least a first value associated with each of the one or more rows. In an embodiment, the processor 202 may determine the first value, pertaining to each of the one or more rows, based on at least the screen angle associated with the halftoned image plane.

Prior to the determination of the first value, the processor 202 may be configured to determine the count of the one or more rows associated with the second transformed image. Thereafter, the processor 202 may be configured to determine the angular value (i.e., the shear angle) based on at least the screen angle associated with the halftoned image plane of the second transformed image, in a similar way as discussed above in step 410.

After the determination of the angular value (i.e., the shear angle), the processor 202 may further be configured to determine the first parameter value based on the determined the angular value (i.e., the shear angle). In an exemplary scenario, the processor 202 may utilize the following relation (denoted by equation-9) to determine the first parameter value:

$$\alpha = -\tan\left(\frac{\text{shear angle}}{2}\right) \quad (9)$$

where,

α: corresponds to a first parameter value.

Thereafter, the processor 202 may be configured to determine the first value, pertaining to each of the one or more rows of the halftoned image plane, based on at least the first parameter value and the count of the one or more rows in the halftoned image plane of the second transformed image. In an exemplary scenario, the processor 202 may utilize the following relation (denoted by equation-10) to determine the first value pertaining to a row "i":

$$\text{first value of row "}i\text{"} = \alpha * \left(i - \frac{n_{row}}{2}\right) \quad (10)$$

where, $n_{row}$: corresponds to a count of one or more rows in a halftoned image plane of a second transformed image.

Thereafter, the image processor 204 may be configured to perform the circular shifting of the one or more pixels in the row "i" based on the determined first value. In an embodiment, the image processor 204 may be configured to circularly shift the one or more pixels in the row "i" by the determined first value of the row "i". In an embodiment, the image processor 204 may be configured to shift the one or more pixels in the row "i" to the right if the determined first value is positive (i.e. first value of row "i">0). In another embodiment, the image processor 204 may be configured to shift the one or more pixels in the row "i" to the left if the determined first value is negative (i.e. first value of row "i"<0).

Similarly, the processor 202 may be configured to determine the first value for each of the remaining one or more rows in the halftoned image plane of the second transformed image. Thereafter, the image processor 204 may be configured to shift the one or more pixels in each of the remaining one or more rows based on the corresponding first value. In case the second transformed image includes more than one halftoned image plane, the image processor 204 may be configured to perform the circular shifting of the one or more pixels for each of the remaining halftoned image planes to generate the first transformed image. The image processor 204 in conjunction with the transceiver 210 may store the first transformed image in the storage device, such as the memory 206 or the database server 106.

In an embodiment, after retrieval of the first transformed image from the storage device, at step 412, the image is extracted from the first transformed image. In an embodiment, the image processor 204 may be configured to extract the image from the first transformed image based on descreening of the first transformed image.

A person having ordinary skills in the art will understand that the retrieved first transformed image may include the one or more halftoned lines that significantly degrade the image quality. Therefore, to remove the one or more halftoned lines from the first transformed image, the image processor 204 may use one or more descreening techniques known in the art. The descreened image (i.e. the extracted image) may be independent of the one or more halftoned lines. Examples of the one or more descreening techniques may include, but are not limited to, a custom band reject filter, a swiss cheese filter, and/or the like.

After extraction of the image, at step 414, the image is rendered on a user interface displayed on the display screen. In an embodiment, the image processor 204 may be configured to render the image on the user interface displayed on the display screen of the requestor-computing device 102 or the multi-function device 104.

At step 416, the first transformed image is transmitted for printing. In an embodiment, the processor 202 may be configured to transmit the first transformed image for printing. Control passes to end step 418.

Figure 5:
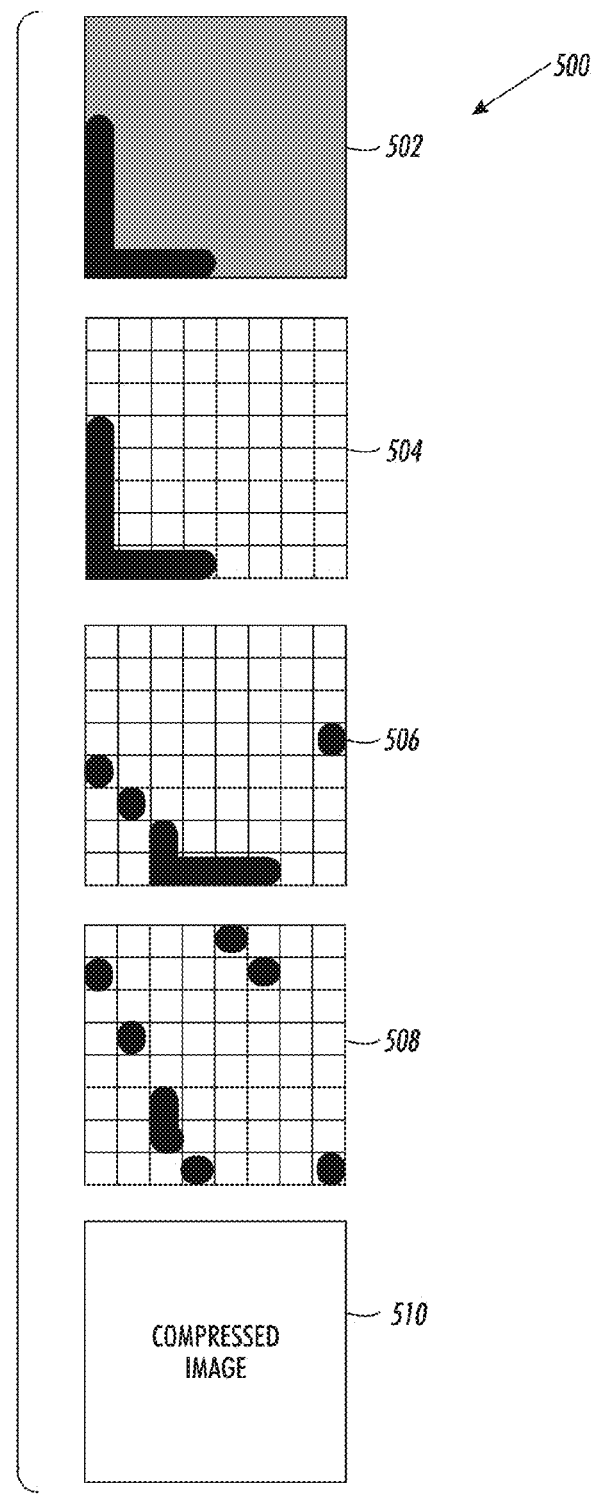
FIG. 5 is a block diagram that illustrates an exemplary scenario of a method for image compression, in accordance with at least one embodiment.

FIG. 5 is a block diagram that illustrates an exemplary scenario of a method for image compression, in accordance with at least one embodiment. With reference to FIG. 5, there is shown a block diagram 500 that includes an image 502, a halftoned image 504, a first transformed image 506, a second transformed image 508, and a compressed image 510, in accordance with an embodiment. FIG. 5 is described in conjunction with elements from FIGS. 1-3.

In an exemplary scenario, a requestor utilizes the requestor-computing device 102 to transmit a request, pertaining to processing of the image 502, to the multi-function device 104 over the communication network 108. The request may include the image 502 and an operation, such as "printing" that is required to be performed on the image 502.

The multi-function device 104 receives the request to process the image 502 from the requestor-computing device 102 over the communication network 108. In an embodiment, the received image 502 may include one or more image planes. For example, the image 502 may include one color image plane, such as "cyan image plane." The screen angle of the image 502 (i.e., cyan image plane of the image 502) is "15 degree" with respect to a reference plane, such as a vertical plane, of the image frame associated with the image 502.

After receiving the image 502, the image processor 204 converts the image 502 to the halftoned image 504 by using one or more screening techniques known in the art. The halftoned image 504 may comprise a halftoned image plane that corresponds to the cyan color image plane of the image 502. The halftoned image plane further includes the one or more halftoned lines, such that each of the one or more halftoned lines includes one or more pixels. The one or more pixels associated with the halftoned image plane in the halftoned image 504 may be distributed along the one or more rows and the one or more columns.

Further, the processor 202 determines the count of the one or more rows and a count of the one or more columns. For example, the count of the one or more rows in the halftoned image plane associated with the halftoned image 504 is "8" and the count of the one or more columns in the halftoned image plane associated with the halftoned image 504 is "8." Thereafter, the processor 202 determines a shear angle based on the screen angle (i.e., "15 degree") of the halftoned image plane associated with the halftoned image 504. By use of the relation denoted by equation-1, the processor 202 determines the shear angle as "75 degree." Further, the processor 202 determines a first parameter value based on the determined shear angle by use of the relation denoted by equation-2. For example, the processor 202 determines the first parameter value as "−0.767."

Subsequently, the processor 202 utilizes the relation denoted by equation-3 to determine a first value pertaining to each of the one or more rows of the halftoned image plane associated with the halftoned image 504. For example, for a first row (i.e., "i"=1), the processor 202 determines the first value as "2.301." The first value may be rounded to integer "2."

Thereafter, the image processor 204 performs the circular shifting of the one or more pixels in the first row based on the determined first value. For example, the image processor 204 circularly shifts the one or more pixels in the first row to the right by "2 pixels" as the determined first value is positive. Similarly, the processor 202 determines the first value for each of the remaining one or more rows of the halftoned image 504. The image processor 204 may perform the circular shifting of the one or more pixels in each of the remaining one or more rows based on the corresponding first values to generate the first transformed image 506. In an embodiment, one or more corners of the first transformed image 506 may be wrapped around after circular shifting of the one or more pixels, to retain the size of the image 502.

Further, the processor 202 determines a second parameter value based on the determined shear angle by use of the relation denoted by equation-4. For example, the processor 202 determines the second parameter value as "0.965."

Thereafter, the processor 202 utilizes the relation denoted by equation-5 to determine a second value pertaining to each of the one or more columns. For example, for a first column (i.e., "j"=1), the processor 202 determines the second value as "−2.895." The second value may be rounded to integer "3." Thereafter, the image processor 204 performs the circular shifting of the one or more pixels in the first column based on the determined second value. For example, the image processor 204 circularly shifts the one or more pixels in the first column in the downward direction by "3 pixels" as the determined second value is positive. Similarly, the processor 202 may determine the second value for each of the remaining one or more columns of the first transformed image 506. The image processor 204 performs the circular shifting of the one or more pixels in each of the remaining one or more columns of first transformed image 506 based on the corresponding second values to generate the second transformed image 508. In an embodiment, one or more corners of the second transformed image 508 may be wrapped around after circular shifting of the one or more pixels, to retain the size of the image 502. Thereafter, the image processor 204 stores the second transformed image 508 in the storage device, such as the memory 206 or the database server 106.

Further, in an embodiment, the image processor 204 compresses the second transformed image 508 to generate the compressed image 510. In an embodiment, the compressed image 510 may be stored in the memory 206 within the multi-function device 104 or the database server 106.

Figure 6:
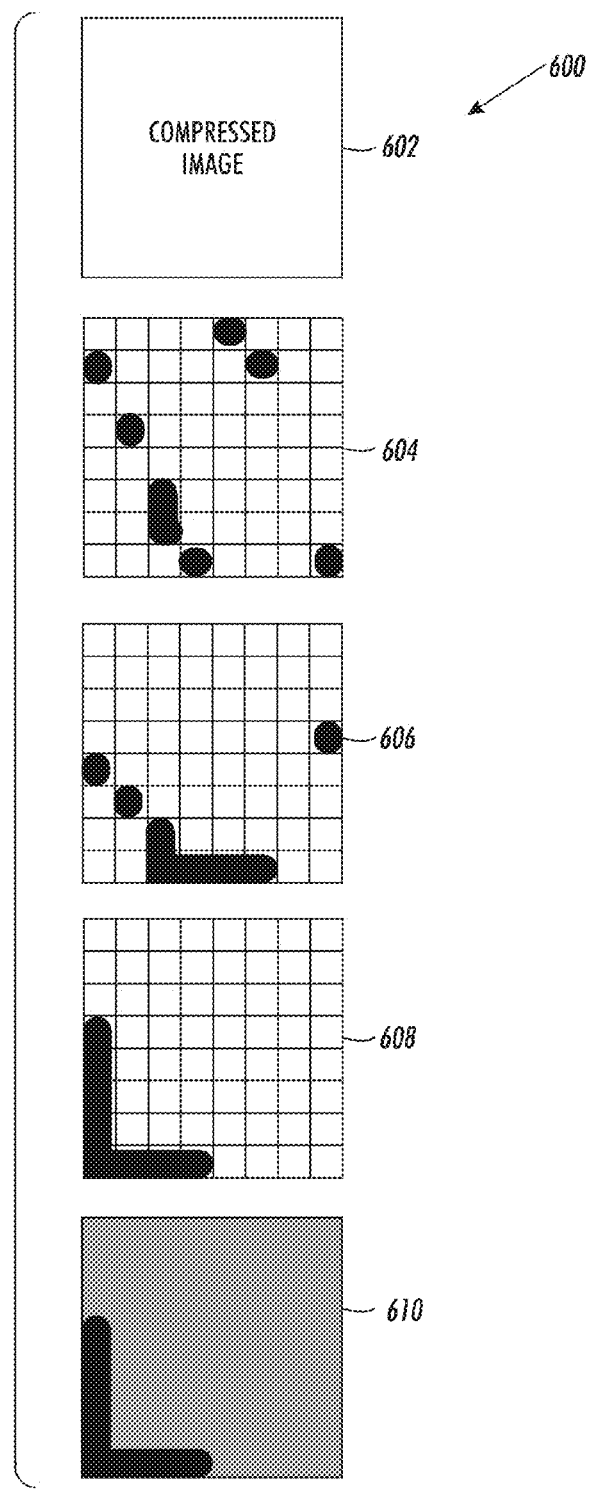
FIG. 6 is a block diagram that illustrates an exemplary scenario of a method for image conversion, in accordance with at least one embodiment.

FIG. 6 is a block diagram that illustrates an exemplary scenario of a method for image conversion, in accordance with at least one embodiment. With reference to FIG. 6, there is shown a block diagram 600 that includes a compressed image 602, a decompressed image 604, a second transformed image 606, a first transformed image 608, and an image 610, in accordance with an embodiment. FIG. 6 is described in conjunction with elements from FIGS. 1-4.

In the exemplary scenario, the image processor 204 may retrieve the compressed image 602 from a storage device, such as the memory 206 or the database server 106. A person having ordinary skills in the art will understand that the compressed image 602 may be same as the compressed image 510 (FIG. 5) without limiting the scope of the disclosure. After retrieval of the compressed image 602, the image processor 204 may decompress the compressed image 602 to generate the decompressed image 604.

In an embodiment, the decompressed image 604 may comprise the one or more halftoned lines. The one or more halftoned lines may include the one or more pixels that are distributed along the one or more rows and the one or more columns in the decompressed image 604. In a scenario, where the decompressed image 604 does not include the one or more halftoned lines, the image processor 204 may further be configured to convert the decompressed image 604 to obtain a decompressed halftoned image (not shown). Further, in an embodiment, the decompressed image 604 (or the decompressed halftoned image) may include the one or more halftoned image planes. For example, the decompressed image 604 includes a halftoned image plane, such as a "cyan image plane." The screen angle of the cyan image plane is "15 degree" with respect to a reference plane, such as a vertical plane, of the image frame associated with the decompressed image 604.

Further, the processor 202 determines a count of the one or more rows and a count of the one or more columns. For example, the count of the one or more rows in the decompressed image 604 is "8" and the count of the one or more columns in the decompressed image 604 is "8." Thereafter, the processor 202 determines the shear angle based on the screen angle of the halftoned image plane associated with the decompressed image 604. By use of the relation denoted by equation-6, the processor 202 determines the shear angle as "−75 degree." Further, the processor 202 determines a second parameter value based on the determined shear angle by use of the relation denoted by equation-7. For example, the processor 202 determines the second parameter value as "−0.965."

Subsequently, the processor 202 may determine the second value, pertaining to each of the one or more columns of the decompressed image 604, based on the second parameter and the count of the one or more columns in the decompressed image 604. For example, for the first column (i.e., "j"=1), the second value, such as "2.895," is determined in accordance with equation-8. The second value may be rounded to integer "3." Similarly, the processor 202 may determine the second value for each of the remaining one or more columns of the decompressed image 604.

Thereafter, the image processor 204 in conjunction with processor 202 may perform the circular shifting of the one or more pixels in the first column based on the determined second value. For example, the image processor 204 may shift the one or more pixels in the first column by "3 pixels" in the downward direction as the second value is positive. Similarly, the image processor 204 may perform the circular shifting of the one or more pixels in each of the remaining one or more columns of the decompressed image 604 based on the corresponding second value.

Therefore, the second transformed image 606 is obtained, after the circular shifting of the one or more pixels pertaining to the one or more columns in the decompressed image 604. In an embodiment, one or more corners of the second transformed image 606 may be wrapped around after circular shifting of the one or more pixels, to retain the size of the decompressed image 604. The image processor 204 in conjunction with the transceiver 210 may store the second transformed image 606 in the memory 206 or the database server 106.

Further, the processor 202 may determine the first parameter value based on the determined shear angle. In an embodiment, the first parameter value, such as "0.767" is determined in accordance with equation (9).

Subsequently, the processor 202 may determine the first value, pertaining to each of the one or more rows of the second transformed image 606, based on the first parameter and the count of the one or more rows in the second transformed image 606. For example, for the first row (i.e., "i"=1), the first value, such as "−2.301" is determined in accordance with equation-10. The first value may be rounded to integer "−2." Similarly, the processor 202 may determine the first value for each of the remaining one or more rows of the second transformed image 606.

Thereafter, the image processor 204 in conjunction with the processor 202 may perform the circular shifting of the one or more pixels in the first row based on the determined first value. For example, the image processor 204 may shift the one or more pixels in the first row by "2 pixels" to the left direction as the first value is negative. Similarly, the image processor 204 may perform the circular shifting of the one or more pixels in each of the remaining one or more rows of second transformed image 606 based on the corresponding first value.

Therefore, the first transformed image 608 is obtained, after the circular shifting of the one or more pixels pertaining to the one or more rows in second transformed image 606. In an embodiment, one or more corners of the first transformed image 608 may be wrapped around after circular shifting of the one or more pixels, to retain the size of the decompressed 604. The image processor 204 in conjunction with the transceiver 210 may store the first transformed image 608 in the memory 206 or the database server 106.

Further, the image processor 204 may retrieve the first transformed image 608 from the memory 206 of the multi-function device 104. After retrieval of the first transformed image 608, the image processor 204 may extract the image 610 from the first transformed image 608 based on descreening of the first transformed image 608. The image processor 204 may use a descreening technique known in the art, such as "a custom band reject filter," to extract the image 610, which is independent of the one or more halftoned lines.

Further, image processor 204 may render the extracted image 610 on the user interface displayed on the display screen of the requestor-computing device 102. In an embodiment, the processor 202 may transmit the first transformed image 608 for printing.

The disclosed embodiments encompass numerous advantages. Various embodiments of the disclosure lead to a method and a system for image compression. Through various embodiments of the disclosure, an image is converted into a halftoned image that comprises one or more halftoned lines. A first transformed image is generated from the halftoned image and a second transformed image is generated from the first transformed image by using at least one of a horizontal shear transformation technique or a vertical shear transformation technique. As the one or more halftoned lines in the generated second transformed image are horizontally parallel, the run length of the pixels increases. The shear transformation may replace regular rotation performed based on three shear transformations (such as one vertical and two horizontal shears), thereby saving computation. Further, the compression ratio of the compressed image, generated from the second transformed image, is high. Furthermore, the original image may be retrieved from the compressed image without any loss in pixel values.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit.

The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

To process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described may also be implemented using only software programming or using only hardware or by a varying combination of the two techniques. The disclosure is independent of the programming language and the operating system used in the computers. The instructions for the disclosure may be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure may also be implemented in various operating systems and platforms including, but not limited to, 'Unix', DOS', 'Android', 'Symbian', and 'Linux'.

The programmable instructions may be stored and transmitted on a computer-readable medium. The disclosure may also be embodied in a computer program product comprising a computer-readable medium, or with any product capable of implementing the above methods and systems, or the numerous possible variations thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

Various embodiments of the methods and systems for compressing and converting an image during printing, have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims may encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for image compression, the method comprising:
    converting, by an image processor, an image to a halftoned image, wherein one or more halftoned lines in the halftoned image comprise one or more pixels;
    generating, by the image processor, a first transformed image from the halftoned image based on shifting of the one or more pixels, associated with the one or more halftoned lines in the halftoned image, by a first value;
    generating, by the image processor, a second transformed image from the first transformed image based on shifting of the one or more pixels, associated with the one or more halftoned lines in the first transformed image, by a second value; and
    generating, by the image processor, a compressed image based on compression of the second transformed image, wherein the compressed image is stored in a storage device.

2. The method of claim 1, wherein the image includes one or more image planes, wherein each of the one or more image planes is associated with a predefined angle, wherein each of the one or more image planes is converted, by the image processor, to obtain a halftoned image plane, wherein the halftoned image includes the one or more halftoned image planes.

3. The method of claim 2, wherein the first transformed image and the second transformed image are generated based on at least the shifting of the one or more pixels in each of the one or more halftoned image planes.

4. The method of claim 3, wherein the first transformed image and the second transformed image are generated by use of at least one of a horizontal shear transformation technique or a vertical shear transformation technique.

5. The method of claim 1, wherein each of the first value and the second value is determined, by one or more processors, based on at least a predefined angle associated with one or more of the one or more halftoned image planes in the halftoned image.

6. The method of claim 5, wherein the shifting of the one or more pixels in each of the halftoned image and the first transformed image corresponds to a circular shifting based on at least one of the first value or the second value.

7. The method of claim 6, wherein the one or more pixels are shifted such that the one or more halftoned lines in the second transformed image are horizontal.

8. A method for image conversion, the method comprising:
   generating, by an image processor, a decompressed image based on a decompression of a compressed image retrieved from a storage device, wherein the decompressed image comprises one or more halftoned lines, wherein each of the one or more halftoned lines comprise one or more pixels;
   generating, by the image processor, a second transformed image from the decompressed image based on shifting of the one or more pixels, associated with the one or more halftoned lines in the decompressed image, by a second value; and
   generating, by the image processor, a first transformed image from the second transformed image based on shifting of the one or more pixels, associated with the one or more halftoned lines in the second transformed image, by a first value, wherein the first transformed image is stored in the storage device.

9. The method of claim 8 further comprising converting, by the image processor, the decompressed image to obtain a decompressed halftoned image comprising the one or more halftoned lines, when the decompressed image is independent of the one or more halftoned lines.

10. The method of claim 9, wherein the decompressed halftoned image or the decompressed image includes a one or more image planes, wherein each of the one or more image planes is associated with a predefined angle.

11. The method of claim 8, wherein the first transformed image and the second transformed image are generated by use of at least one of a horizontal shear transformation technique or a vertical shear transformation technique.

12. The method of claim 8, wherein each of the first value and the second value is determined, by one or more processors, based on at least a predefined angle associated with each of the one or more halftoned image planes associated with at least one of the decompressed image or the second transformed image.

13. The method of claim 12, wherein the shifting of the one or more pixels, associated with the one or more halftoned lines in each of the decompressed image and the second transformed image, corresponds to a circular shifting based on at least one of the first value or the second value.

14. The method of claim 8 further comprising extracting, by the image processor, an image from the first transformed image retrieved from the storage device.

15. The method of claim 14 further comprising rendering, by the image processor, the image on a user interface displayed on a display screen.

16. The method of claim 8 further comprising transmitting, by the image processor, the first transformed image for printing.

17. A system for image compression, the system comprising:
   an image processor configured to:
   convert an image to a halftoned image, wherein one or more halftoned lines in the halftoned image comprise one or more pixels;
   generate a first transformed image from the halftoned image based on circular shifting of the one or more pixels, associated with the one or more halftoned lines in the halftoned image, by a first value;
   generate a second transformed image from the first transformed image based on circular shifting of the one or more pixels, associated with the one or more halftoned lines in the first transformed image, by a second value; and
   generate a compressed image based on compression of the second transformed image, wherein the compressed image is stored in a storage device.

18. The system of claim 17, wherein the image processor is configured to generate the first transformed image and the second transformed image by use of at least one of a horizontal shear transformation technique or a vertical shear transformation technique.

19. The system of claim 17, wherein one or more processors are configured to determine each of the first value and the second value based on at least a predefined angle associated with each of the one or more halftoned image planes in the halftoned image.

20. The system of claim 18, wherein the one or more pixels are shifted such that halftoned lines in the second transformed image are aligned at zero degree with respect to horizontal reference.

21. A system for image conversion, the system comprising:
   an image processor configured to:
   generate a decompressed image based on a decompression of a compressed image retrieved from a storage device, wherein the decompressed image comprises one or more halftoned lines, wherein each of the one or more halftoned lines comprise one or more pixels;
   generate a second transformed image from the decompressed image based on circular shifting of the one or more pixels, associated with the one or more halftoned lines in the decompressed image, by a second value; and
   generate a first transformed image from the second transformed image based on circular shifting of the one or more pixels, associated with the one or more halftoned lines in the second transformed image, by a first value, wherein the first transformed image is stored in the storage device.

22. The system of claim 21, wherein the image processor is further configured to convert the decompressed image to obtain a decompressed halftoned image comprising the one or more halftoned lines, when the decompressed image is independent of the one or more halftoned lines.

23. The system of claim 21, wherein the image processor is further configured to generate the first transformed image and the second transformed image by use of at least one of a horizontal shear transformation technique or a vertical shear transformation technique.

24. The system of claim 21, wherein one or more processors are further configured to determine each of the first value and the second value based on at least a predefined angle associated with one or more of the one or more halftoned image planes associated with at least one of the decompressed image or the second transformed image.

25. The system of claim 21, wherein the image processor is further configured to extract an image from the first transformed image retrieved from the storage device.

26. The system of claim 25, wherein the image processor is further configured to render the image on a user interface displayed on a display screen.

27. The system of claim 21, wherein the image processor is further configured to transmit the first transformed image for printing.

28. A non-transitory computer-readable storage medium having stored thereon, a set of computer-executable instructions for causing a computer comprising an image processor to perform steps comprising:
- converting an image to a halftoned image, wherein one or more halftoned lines in the halftoned image comprise one or more pixels;
- generating a first transformed image from the halftoned image based on shifting of the one or more pixels, associated with the one or more halftoned lines in the halftoned image, by a first value;
- generating a second transformed image from the first transformed image based on shifting of the one or more pixels, associated with the one or more halftoned lines in the first transformed image, by a second value; and
- generating a compressed image based on compression of the second transformed image, wherein the compressed image is stored in a storage device.

29. A non-transitory computer-readable storage medium having stored thereon, a set of computer-executable instructions for causing a computer comprising an image processor to perform steps comprising:
- generating a decompressed image based on a decompression of a compressed image retrieved from a storage device, wherein the decompressed image comprises one or more halftoned lines, wherein each of the one or more halftoned lines comprise one or more pixels;
- generating a second transformed image from the decompressed image based on shifting of the one or more pixels, associated with the one or more halftoned lines in the decompressed image, by a second value; and
- generating a first transformed image from the second transformed image based on shifting of the one or more pixels, associated with the one or more halftoned lines in the second transformed image, by a first value, wherein the first transformed image is stored in the storage device.

* * * * *